United States Patent
Kadampaarambath Mohamed Haneefa

(10) Patent No.: US 10,817,313 B2
(45) Date of Patent: Oct. 27, 2020

(54) MACHINE LEARNING TECHNIQUES FOR ADAPTATION OF INITIAL WORKSPACE

(71) Applicant: Adobe Inc., San Jose, GA (US)

(72) Inventor: Aneesh Raj Kadampaarambath Mohamed Haneefa, Bengaluru (IN)

(73) Assignee: ADOBE INC., San Jose, CA (US)

( * ) Notice: Subject to any disclaimer, the term of this patent is extended or adjusted under 35 U.S.C. 154(b) by 179 days.

(21) Appl. No.: 15/903,380

(22) Filed: Feb. 23, 2018

(65) Prior Publication Data

US 2019/0265989 A1  Aug. 29, 2019

(51) Int. Cl.
*G06F 9/451* (2018.01)
*G06K 9/62* (2006.01)
*G06N 20/00* (2019.01)

(52) U.S. Cl.
CPC .......... *G06F 9/451* (2018.02); *G06K 9/6215* (2013.01); *G06K 9/6267* (2013.01); *G06N 20/00* (2019.01)

(58) Field of Classification Search
CPC ........... G06F 9/451; G06F 15/18; G06F 9/453
See application file for complete search history.

(56) References Cited

U.S. PATENT DOCUMENTS 10,178,527 B2 * 1/2019 Sharifi .................... H04L 67/22
2005/0091647 A1 * 4/2005 McCollum ................ G06F 8/20
717/130

* cited by examiner

*Primary Examiner* — Andrea C Leggett
(74) *Attorney, Agent, or Firm* — Kilpatrick Townsend & Stockton LLP

(57) ABSTRACT

An initial workspace recommendation engine recommends a user interface component available for inclusion in an initial workspace of a newly installed application instance. In some cases, a classifier included in the engine classifies the available user interface component based on data describing multiple previously installed instances of the application. For example, the multiple instances are installed on multiple user devices, and are associated with user features describing the installed instances. In addition, the initial workspace recommendation engine receives a set of new user features associated with the newly installed application instance. The classifier classifies the available user interface component based on a similarity between the new user features and the user features describing the installed instances. Based on the classification, the initial workspace recommendation engine recommends the available user interface component for inclusion in or omission from the initial workspace of the newly installed instance.

20 Claims, 6 Drawing Sheets

MACHINE LEARNING TECHNIQUES FOR ADAPTATION OF INITIAL WORKSPACE

FIELD OF THE INVENTION

This disclosure relates generally to the field of machine learning, and more specifically relates to modifying configuration data describing an initial workspace.

BACKGROUND

An application, such as a web development application, provides an initial workspace that includes user interface components for accessing functions of the application. The application shows an initial workspace immediately after installation and start-up for the first time. A user may find the application more efficient and pleasant to use if the initial workspace is relevant to his or her usage patterns and goals. However, for a new user that installs the application for the first time, the initial workspace typically has default application components not customized to the new user's preferences. Hence, the new user may be frustrated or confused by some of the displayed components, such as components that are irrelevant to the user's needs. In addition, displaying these components may require additional computing resources, causing the application to perform inefficiently.

In one non-limiting example, a web development application includes multiple functions related to editing a webpage. The functions enable various operations of the application, such as adding text and hyperlinks to a page, embedding scripts or other computer code, managing multiple websites, or other aspects of website editing. After installation, an initial workspace of the application includes user interface components that allow a user to access some of the various functions. However, a default initial workspace that is not modified for the user could include unnecessary components. For example, a hobbyist user might be confused and overwhelmed by displayed components that are irrelevant to the hobbyist, such as a component for embedding scripts. A professional user might be annoyed that components important to the professional are missing from the default workspace, such as a component for managing large websites. In such cases, the example initial workspace frustrates or confuses users of the newly installed application.

In addition, loading or displaying unnecessary components requires computing resources, slowing or causing inefficient performance of the application. For example, some user interface components are included or displayed in a workspace via computer code that is separate from code related to the application, such as plug-ins, scripts, or other pieces of separate code. In some cases, an application requires additional computing resources for each plug-in that it loads, such as additional network resources to access the plug-in, additional local storage to store a local copy of the plug-in, or additional memory to run the plug-in with the application. In such cases, an initial workspace that includes a large number of user interface components performs inefficiently, such as by requiring a large amount of computing resources to access, load, and display plug-ins associated with the components.

An application may be designed and programmed to display an initial workspace that is imagined to meet a user's needs. In one existing solution, an application development team studies the expected user's needs and selects user interface components based on the expected needs. The application is then designed and released with an initial workspace that displays the selected components. However, the relevance of the components in the initial workspace can vary. In one example, the relevance depends on the type of the user. For instance, the designed initial workspace displays components that are important to a professional user. If a hobbyist installs the application, these components in the initial workspace are irrelevant to him or her, and could cause confusion. In another example, the relevance varies with time. For instance, some of the components can become outdated over time, such as from changes in user practices. In both examples, given that the component relevance changes over time, it is desirable to provide techniques to dynamically modify the initial workspace presented to each new user, for multiple new installations of the application over time. In existing solutions, the adaptability is limited to users making the changes to the workspace (e.g., by altering the application settings).

SUMMARY

According to certain embodiments, an initial workspace recommendation engine receives data describing multiple installed instances of an application, such as instances that are previously installed on multiple computing systems. The received data describes user interface components that are available to be included in or omitted from workspaces of the installed instances. In addition, the received data describes user features that are associated with the installed instances. In some cases, a subset of the received data is selected by the initial workspace recommendation engine, such as a subset of data describing evaluated instances of the application (e.g., instances that have completed an evaluation period). Based on the received data (or the subset of data), one or more classifiers are trained to identify that the available user interface components are included in or omitted from workspaces of the installed instances. For example, the classifier is trained to identify that an available component is included in workspaces for installed instance that are associated with one or more of the described user features.

In some embodiments, the initial workspace recommendation engine receives data describing a newly initialized instance of the application, such as new user features associated with the newly initialized instance. In addition, the trained classifier classifies the available user interface component, such as based on a similarity between the new user features and the received data (or subset of data). In some cases, the initial workspace recommendation engine generates a recommendation to include or omit the available component in the initial workspace for the newly initialized instance. The recommendation is provided, for example, to the newly initialized instance.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
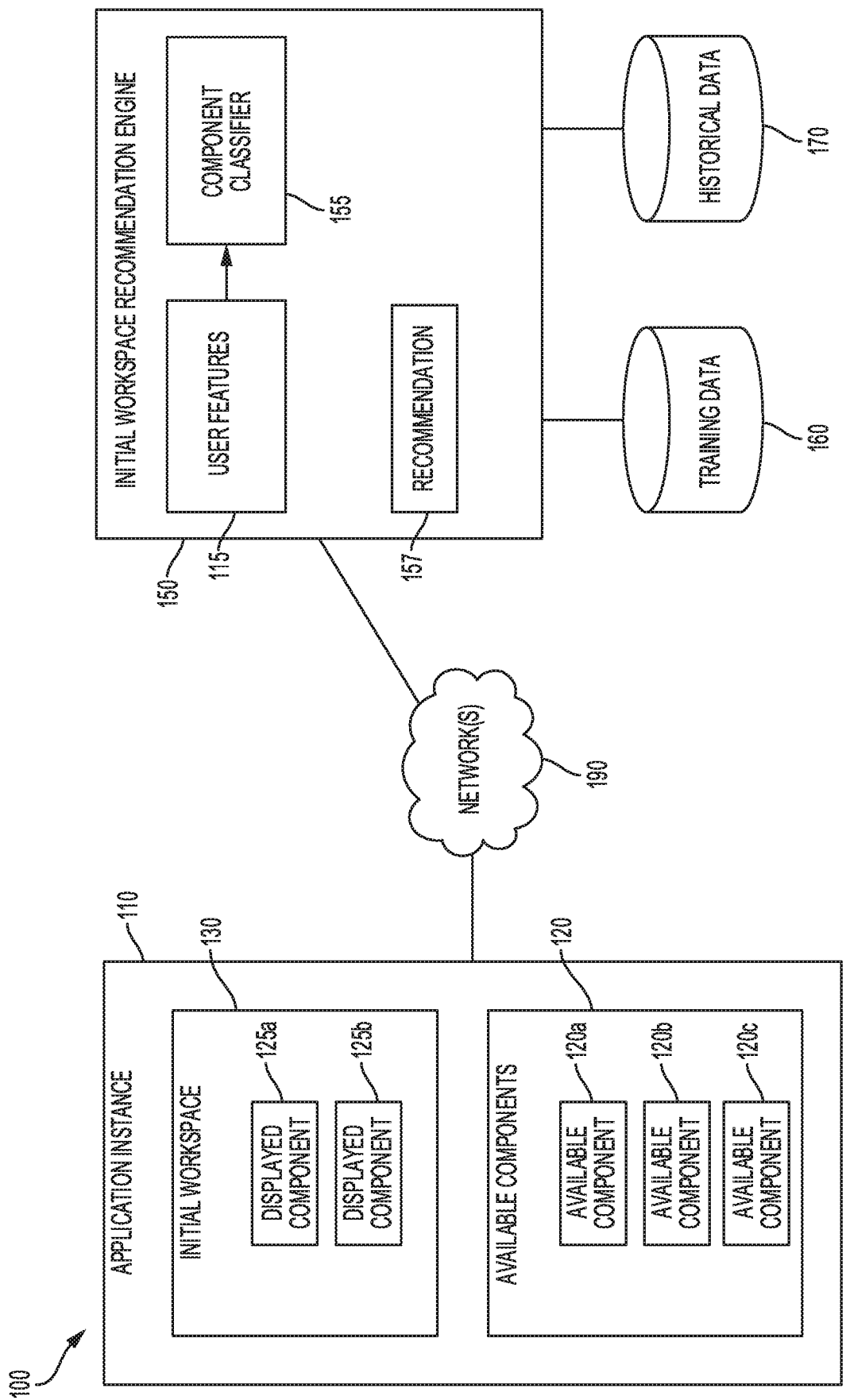
FIG. 1 is a block diagram depicting an example of an initial workspace selection system capable of configuring an initial workspace, according to certain embodiments.

As discussed above, prior techniques for providing an initial workspace do not provide an initial workspace that is computationally efficient and also relevant to a user's needs. Embodiments of the present disclosure address these computational efficiency and use relevance issues. For example, the embodiments provide for classifying user interface components that are available for inclusion in an initial workspace, and generating a recommendation for the available components based on the classification. The classification generally relies on machine learning techniques. The embodiments also provide for modifying the configuration of the initial workspace to include or omit available components based on the recommendation for the available components.

The following examples are provided to introduce certain embodiments of the present disclosure. In some embodiments, an initial workspace recommendation system receives historical data describing user features and user interface components that are associated with multiple installed instances of an application. The historical data describes application instances that are already installed, and have been reconfigured by existing users of the respective instances. For example, a particular existing application instance has been reconfigured for an existing user to include a particular user interface component. The data describes the instance, the component, and a set of user features associated with the existing user and her respective instance. Additionally or alternatively, the initial workspace recommendation system includes a classifier. The classifier is trained to classify whether an available user interface component should be included in an initial workspace for a new user. In an example, the training relies on training tuples generated from the historical data. For instance, the classifier receives a tuple of data, the tuple including user features for a particular instance and an indication of whether the available component was included in the particular instance. The classifier is trained to identify that the available component is typically included in instances with the user features included in the tuple. Hence, for a new user that shares the user features, the classifier can recommend inclusion of the available component in the initial workspace of the new user.

In some cases, the amount of historical data is very large, describing a large number of existing application instances.

In such cases, training the classifier on the large amount of data requires a large amount of computing resources, and could produce inaccurate results. For example, the historical data could describe application instances associated with existing users who are relatively inexperienced with the application, and also describe existing users who are highly experienced with the application (e.g., "super-users"). The historical data related to the highly experienced users could skew the classifier's results away from recommendations suitable for a new user. To limit the amount of data for training, the initial workspace recommendation system selects a subset of the data based on criteria applied to the received data. The criteria include, for example, whether a particular application instance has been evaluated, or whether the particular instance is used frequently. The training of the classifier then uses the subset rather than the entire historical data. In some cases, efficiency of the training, accuracy of the trained classifier, or both are improved by training based on the limited data subset.

Upon completion of the training, the initial workspace recommendation system receives new user features associated with a newly initialized instance of the application (e.g., a new installation that has not yet been displayed to the user). The trained classifier classifies the available user interface component, for example, based on a similarity between the new user features and user features described in the received data (or the limited data subset). For example, the trained classifier receives a tuple including the new user features, and the trained classifier provides a classification of "yes," indicating that the available component is typically included in workspaces associated with the new user features.

Based on the classification, the initial workspace recommendation engine generates a recommendation to include or omit the available component in an initial workspace for the newly initialized instance. In some cases, the newly initialized instance modifies a configuration of the initial workspace based on the recommendation, such that the initial workspace presented to the user includes (or omits) the classified component.

In some cases, the modified initial workspace improves one or more of the experiences of the user or computing efficiency of the installed application instance. By displaying an initial workspace that includes user interface components relevant to similar users, the newly installed application instance enables the user to quickly begin using the application. The user may save time and effort, since she may spend more time using the application and less time searching settings panels for components appropriate to her needs. In addition, the application instance may perform more efficiently by only loading and displaying components that are relevant to the user, maximizing use of computing resources and time. For example, an application instance that loads and displays a smaller number of user interface components has improved performance (e.g., faster, requires less memory) than an instance that loads and displays a larger number of user interface components. Displaying a smaller number of components that are relevant to the user is a more efficient use of computing resources than displaying a larger number of components that might or might not be relevant to the user.

As used herein, the terms "application instance" and "instance" refer to a particular instance of an application that is installed on a particular computing system. The instance includes, for example, a group of files or other software data structure that are installed on a computing system, such as a laptop, personal computer, mobile computing device (e.g., tablet, smartphone, virtual or networked computing system (e.g., a virtual machine, a cloud-based system). In some cases, an instance includes locally installed copies of data structures that are stored on a memory or storage device that is accessible by a particular computing system. Additionally or alternatively, the instance includes remotely stored copies of data structures that are accessed by the particular computing system, such as a network-accessible application that provides a particular instance to the particular computing system. In some cases, an instance accesses files or other data structures that are accessible by multiple other instances, such as a shared library of content items, or one or more available user interface components.

As used herein, the term "initial workspace" refers to a workspace that is displayed by an application upon an initial installation and execution of an instance of the application. For example, the initial workspace includes a user interface ("UI"), or a graphical user interface ("GUI"), that is provided to a user for initial interactions with the application instance following installation. In some cases, the initial workspace provides user interface components related to performing tasks enabled by the application instance. Additionally or alternatively, the workspace of the application is differentiated from additional user interfaces of the instance, such as an additional user interface related to user registration during installation of the instance.

As used herein, the terms "component" and "user interface component" refer to a component that enables user interaction with an application instance, such as via a workspace. For example, the component is displayed in a graphical user interface for the application instance. Additionally or alternatively, the component enables a user to access functions of the application instance, such as functions related to creating, modifying, or saving a file. In some cases, the component is selected for inclusion in the workspace based on configuration data describing the workspace. Additionally or alternatively, the component is available for selection, such as a component that is available via a network-accessible group of available components.

As used herein, the terms "newly initialized" and "newly installed" refer to an instance of an application that is installed (or in process of being installed) on a computing system, but has not yet displayed a user interface including a workspace. In some cases, a user interacts with an additional user interface (e.g., a non-workspace user interface) during initialization. For example, a user accesses a registration user interface (e.g., to provide registration information) prior to the application instance displaying the initial workspace. In some cases, a newly initialized application instance has not received inputs from a user regarding configuration of the workspace. For example, the newly initialized application instance has not received user inputs indicating a modification (e.g., personalization) of the initial workspace.

Referring now to the drawings, FIG. 1 depicts an example of an initial workspace selection system 100 in which an application instance 110 configures an initial workspace 130 based on information received from an initial workspace recommendation engine 150. In the system 100, the application instance 110 is an instance of an application that is installed on a computing system for a user. The application instance 110 includes, for example, the initial workspace 130, such as a GUI via which a user interacts with the application instance 110. Additionally or alternatively, the initial workspace 130 includes one or more components that enable interactions between the user and the application instance 110. For example, the initial workspace 130 includes graphical elements in the GUI, such that the user may access functions of the application instance 110 by interacting with the graphical elements.

In some embodiments, the application instance 110 accesses one or more available components, such as a set of available components 120, to provide the components included in the initial workspace 130. For example, the set of available components 120 includes available components 120*a*, 120*b*, and 120*c*. In some cases, the application instance 110 selects one or more of the available components 120, and configures the initial workspace 130 to include components that correspond to the selected ones of the available components 120. In the system 100, the initial workspace 130 is configured to include the displayed components 125*a* and 125*b*, corresponding to the respective available components 120*a* and 120*b*. In some implementations, the initial workspace 130 is configured to include the selected ones of the available components 120 in a secondary location of the workspace 130, such as in a "quick reference" menu.

In some cases, the application instance 110 selects one or more of the available components 120 based on information received from the initial workspace recommendation engine 150. Additionally or alternatively, the initial workspace recommendation engine 150 receives information about a user of the application instance 110 and determines a recommendation of one or more of the available components 120 based on the received information. For example, the initial components recommendation engine 150 receives the user features 115, such as from the application instance 110 or from an additional computing system. The user features 115 include, for example, information describing one or more characteristics of the user that has installed the application instance 110. In some cases, the user features 115 include information provided by one or more of the user (e.g., name, profession, age), the application instance 110 (e.g., operating system, system specifications), or the additional computing system (e.g., clickstream data indicating how the user reached a download site for the application instance 110). For example, the user provides registration information to a registration system while acquiring (e.g., downloading) an executable package for the application instance 110, and the initial workspace recommendation engine 150 receives the user features 115 from the registration system.

In system 100, the initial workspace recommendation engine 150 provides some or all of the user features 115 to one or more classifiers, such as a component classifier 155. The component classifier 155 determines a classification of one or more of the available components 120 based on, for example, values of the user features 115. In some implementations, the initial workspace recommendation engine 150 generates a recommendation 157 indicating whether or not to select one of the available components 120 for inclusion in the initial workspace 130, based on the determined classification of the available components 120. For example, the recommendation 157 includes data indicating an inclusion of the available components 120*a* and 120*b* and an omission of the available component 120*c*. Additionally or alternatively, the initial workspace recommendation engine 150 provides the generated recommendation 157 to the application instance 110, such as via the networks 190. In some cases, the component classifier 155 classifies the available components 120 based on a similarity between the user features 115 and additional user features that are associated with additional instances of the application instance 110. For example, the component classifier 155 accesses additional user features included in one or more of training data 160 or historical data 170.

In some implementations, the application instance 110 selects one or more of the available components 120 based on the recommendation 157 from the initial workspace recommendation engine 150. For example, the application instance 110 configures the initial workspace 130 to include the displayed components 125*a* and 125*b*, based on the data indicating the inclusion of the corresponding available components 120*a* and 120*b*. Additionally or alternatively, the application instance 110 configures the initial workspace 130 to omit a displayed component corresponding to the available component 120*c*, based on the data indicating the omission.

Although FIG. 1 depicts the application instance 110 as including the set of available components 120, other implementations are possible. For example, the application instance 110 accesses the available components 120 via a component locally included in a computing system on which the application instance 110 is installed, such as a memory component or storage component. Additionally or alternatively, the application instance 110 accesses additional available components via one or more computer networks 190, such as additional available components included in one or more additional computing systems (including, optionally, distributed or virtual computing systems). For example, the application instance 110 accesses additional available components stored in a computing system that includes the initial workspace recommendation engine 150. In some cases, the application instance 110 accesses a combination of available components that are locally stored and additional available components accessed via the networks 190.

Figure 2:
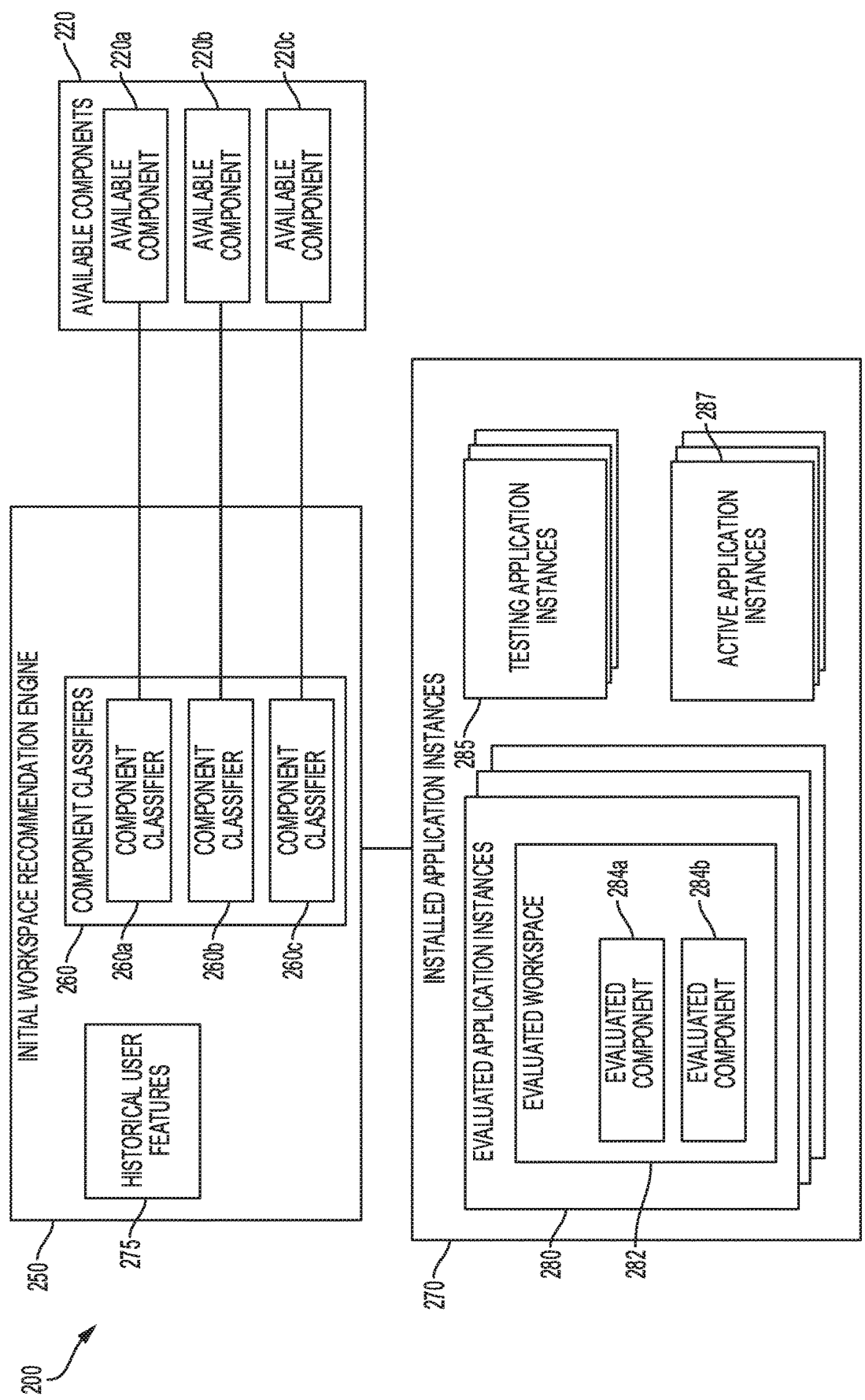
FIG. 2 is a block diagram depicting an example of an initial workspace selection system capable of classifying available components based on user features associated with installed instances of an application, according to certain embodiments.

FIG. 2 depicts an example of an initial workspace selection system 200 in which available components 220 are classified based on multiple sets of user features associated with multiple instances of an application. In the system 200, an initial workspace recommendation engine 250 receives information describing multiple instances of a particular application (e.g., a web design application) that are already installed on multiple respective computing systems. For example, the initial workspace recommendation engine 250 receives information describing installed application instances 270. In some cases, the information is received from the installed application instances 270, such as via one or more computer networks. Additionally or alternatively, the information is received from an additional computing system, such as an analytics server, that stores information about the installed application instances 270.

In the system 200, the initial workspace recommendation engine 250 includes one or more component classifiers 260 that each correspond to a respective one of the available components 220. For example, a component classifier 260*a* corresponds to an available component 220*a*. Additionally or alternatively, component classifiers 260*b* and 260*c* correspond respectively to available components 220*b* and 220*c*. In some cases, the initial workspace recommendation engine 250 provides to the component classifiers 260 the information describing some or all of the installed application instances 270. For example, the component classifiers 260 receive information describing whether the available components 220 are included in workspaces of the installed application instances 270. Additionally or alternatively, the component classifiers 260 receive information describing features of users associated with the installed application instances 270, such as the historical user features 275.

In some cases, each of the component classifiers 260 classifies the respective one of the available components 220 based on the information describing the installed application instances 270. Additionally or alternatively, each of the component classifiers 260 are trained to classify whether the respective one of the available components 220 is included in or omitted from a workspace of a particular instance of the installed application instances 270, based on the historical user features 275 associated with the particular instance. For example, the component classifier 260*a* is trained to classify whether the available component 220*a* is included in a particular instance, based on whether the available component 220*a* is included in or omitted from the workspace of the particular instance, and on one or more of the historical user features 275 that are associated with the particular instance. In some cases, the component classifiers 260 classify whether the available components 220 should be included in or omitted from an initial workspace of a newly installed application instance, based on a similarity between one or more of the historical user features 275 and additional user features associated with the newly installed instance. A non-limiting example of a type of classifier included in the component classifiers 260 is a logistic regression classifier, but other types of classifiers may be used.

In some embodiments, the initial workspace recommendation engine 250 determines one or more subsets of the installed application instances 270. Additionally or alternatively, the component classifiers 260 classify (or are trained to classify) the available components 220 based on the one or more subsets. For example, the initial workspace recommendation engine 250 determines a first subset of instances that have been evaluated by users, such as evaluated application instances 280. The initial workspace recommendation engine 250 determines that a particular instance of the installed application instances 270 is included in the evaluated application instances 280 based on an indication that a user has completed an evaluation of the particular instance. For example, a user converts a trial license for the particular instance to a paid membership license, or the user allows the trial license to expire without converting to a paid membership license. In some cases, each of the evaluated application instances 280 includes an evaluated workspace 282 with one or more evaluated components 284, such as evaluated components 284*a* and 284*b*. Additionally or alternatively, the component classifiers 260 classify the available components 220 based on whether the available components 220 are included in the evaluated workspaces 282 of the evaluated application instances 280 sub set.

In some cases, the determination of the subset of the evaluated application instances 280 provides to the initial workspace recommendation engine 250 data describing workspaces either beneficial or detrimental to the user's needs. For example, a user that chooses to convert a trial license to a paid membership license finds benefit in the components that are included in the workspace at the time of converting the license. An additional user that chooses to allow a trial license to expire without converting to a paid membership license does not find benefit in the components that are included in the workspace at the time of the license expiration. By determining the subset including the evaluated application instances 280, the initial workspace recommendation engine 250 may more efficiently and more accurately perform operations related to generating a recommendation, such as by basing the operations on a reduced subset of data describing instances that were evaluated by users to have value (e.g., converting the license) or to lack value (e.g., license expiration) to the users. For example, a reduced data subset may allow the component classifiers 260 to train or classify more quickly or accurately.

In the system 200, the initial workspace recommendation engine 250 determines a second subset of instances that are still being evaluated by users, such as testing application instances 285. The initial workspace recommendation engine 250 determines that a particular instance of the installed application instances 270 is included in the testing application instances 285 based on an indication that a user is performing an evaluation of the particular instance. For example, a trial license associated with the particular instance is not expired and is not converted to a paid membership license. In some cases, the initial workspace recommendation engine 250 omits data related to the testing application instances 285 from operations related to generating a recommendation. Additionally or alternatively, data describing workspaces or displayed components included in the testing application instances 285 is omitted from such operations. Omitting data related to the testing application instances 285 may enable the initial workspace recommendation engine 250 to perform operations related to generating a recommendation more efficiently and more accurately, such as by reducing the size of a data subset used for training or classifying, or by removing less relevant data from the data subset.

In some embodiments, the initial workspace recommendation engine 250 determines a third subset of instances that exceed a threshold value of usage time, such as active application instances 287. Instances in the active application instances 287 include, for example, workspaces or displayed components that have a usage time above the threshold value. In some cases, the active application instances 287 are determined based on the evaluated application instances 280, such as a further subset of the evaluated instances. For example, the initial workspace recommendation engine 250 determines that a particular instance of the installed application instances 270 is included in the active application instances 287 based on an indication that the particular instance is used for an amount of time that equals or exceeds a threshold amount of time (e.g., 20 hours of usage per week). Additionally or alternatively, the initial workspace recommendation engine 250 determines that the particular instance is included in the active application instances 287 based on an indication that a trial license associated with the particular instance was converted to a paid membership license, or that the license was converted within a threshold window of time (e.g., within the previous three months). By determining the subset including the active application instances 287, the initial workspace recommendation engine 250 may further improve efficiency and accuracy of operations related to generating a recommendation, such as by basing the operations on a further reduced subset of data describing instances that were evaluated by users (e.g., converting the license) and the user is actively using the instance or a particular displayed component (e.g., usage time equals or exceeds a threshold). In some cases, by further limiting the active application instances 287 based on license conversion within a threshold window of time, the initial workspace recommendation engine 250 may further improve accuracy by focusing on users who are still relatively new to the application, and omitting users who are highly experienced whose usage patterns may not resemble those of a first-time user of an initially installed application instance.

Figure 3:
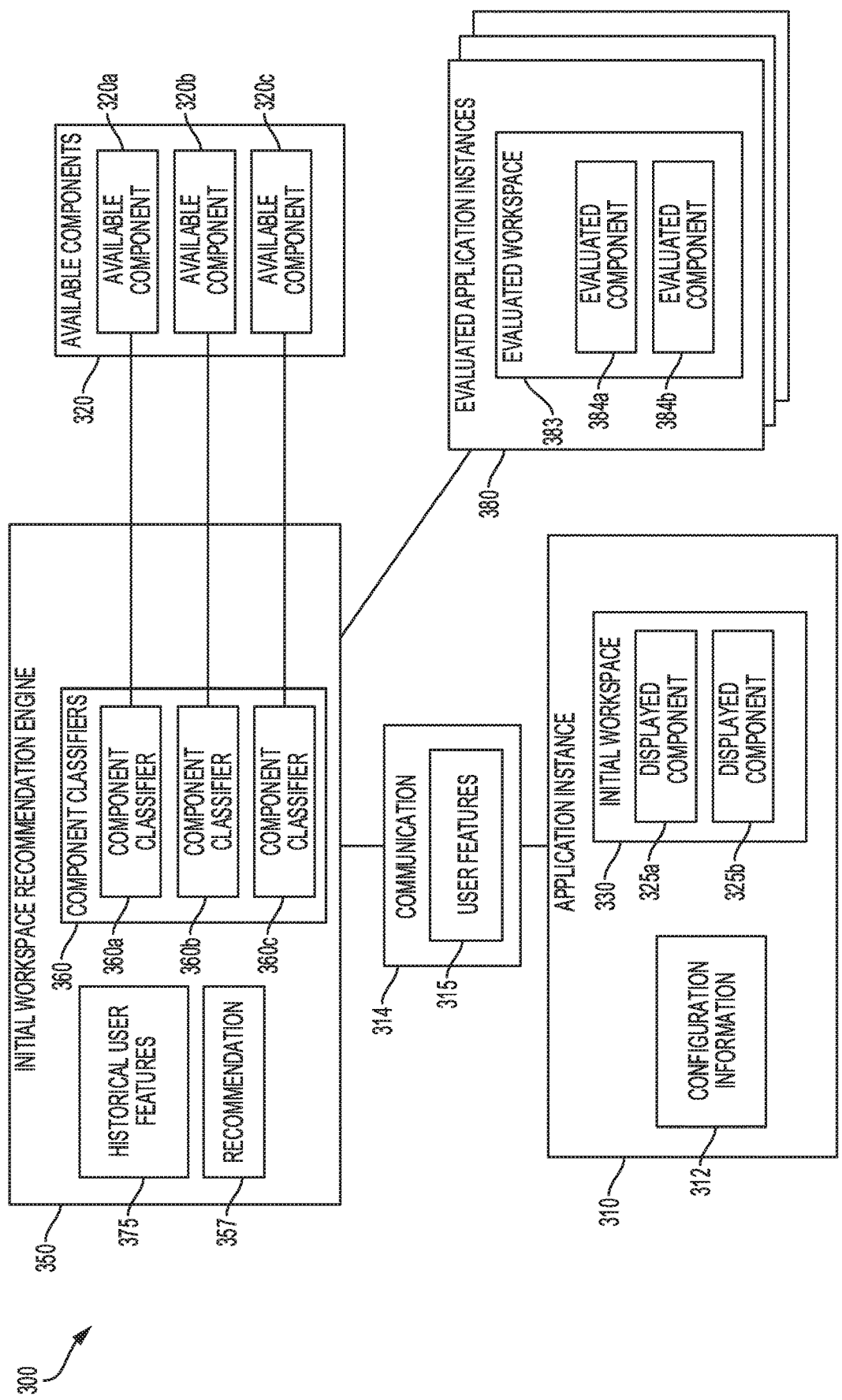
FIG. 3 is a block diagram depicting an example of an initial workspace selection system capable of classifying available components based on a similarity between one or more new user features and historical user features, according to certain embodiments.

FIG. 3 depicts an example of an initial workspace selection system 300 in which available components 320 are classified based on a similarity between one or more user features associated with a newly installed instance of an application and historical user features associated with a subset of historical application instances. In the system 300, an initial workspace recommendation engine 350 classifies available components 320 based on similarities between one or more user features 315 and historical user features 375. Additionally or alternatively, the historical user features 375 are associated with one or more evaluated application instances 380. In some cases, the evaluated application instances 380 are a subset selected from a set of previously installed application instances, such as described in regards to FIG. 2.

In some embodiments, the system 300 includes a newly initiated application instance 310. The application instance 310 is, for example, an instance of a particular application (e.g., a web design application) that is newly installed on a computing system of a user. Additionally or alternatively, the application instance 310 includes information 312 related to configuring an initial workspace 330 of the application instance 310. The configuration information 312 includes, for example, information describing a default configuration of the initial workspace 330.

In the system 300, the initial workspace recommendation engine 350 receives a communication 314 from the newly initiated application instance 310. In some cases, the communication 314 includes a request for a workspace recommendation, such as a request for a recommendation for the initial workspace 330. Additionally or alternatively, the communication 314 indicates some or all of the configuration information 312, such as an indication of the default configuration of the initial workspace 330. In some cases, the communication 314 is provided to the initial workspace recommendation engine 350 after the initialization of the application instance 310 and before a user interface including the initial workspace 330 is displayed to the user. For example, the communication 314 is provided to the initial workspace recommendation engine 350 during a download or installation of the application instance on the user's computing system. FIG. 3 depicts the application instance 310 providing the communication 314, but other implementations are possible. For example, a server providing a download (e.g., of the application instance) to the user's computing system could provide the communication 314 (or an additional communication) to the initial workspace recommendation engine 350.

In some embodiments, the communication 314 includes one or more of the user features 315. The user features 315 describe, for example, features associated with one or more of the user or the newly initiated application instance 310. Non-limiting examples of the user features 315 include data describing the user (e.g., profession, geographic location), data describing the user's computing system (e.g., an operating system), data describing the application instance 310 (e.g., a student trial license, a clickpath to a download link), or other suitable types of data.

The initial workspace recommendation engine 350 in the system 300 may compare one or more of the user features 315 to the historical user features 375 associated with the evaluated application instances 380. In some cases, one or more of a group of component classifiers 360 determine similarities between the user features 315 and the historical features 375. Additionally or alternatively, each of the component classifiers 360 classifies a respective one of the available components 320 based on the determined similarities. For example, the component classifier 360a classifies an available component 320a based on a first determined similarity (or similarities) between the user features 315 and the historical user features 375. The classification indicates, for example, if the available component 320a is recommended for the initial workspace 330 based on the first similarity. Additionally or alternatively, the component classifiers 360b and 360c each respectively classify the available components 320b and 320c based on respective additional determined similarities, and the respective classifications indicate whether the available components 320b and 320c are recommended for the initial workspace 330 based on the respective additional similarities.

In some cases, the initial workspace recommendation engine 350 generates a recommendation 357 based on the classifications generated by the component classifiers 360. The recommendation 357 indicates, for example, whether one or more of the available components 320 is recommended for inclusion in the initial workspace 330. Additionally or alternatively, the recommendation 357 indicates whether one or more of the available components 320 is recommended for omission from the initial workspace 330. In some cases, the recommendation 357 includes additional information, such as a ranking for one or more of the available components 320 (e.g., "highly recommended," "moderately recommended"). The initial workspace recommendation engine 350 provides the recommendation 357, for example, to the application instance 310, such as via an additional communication (not depicted in FIG. 3).

In the system 300, the application instance 310 modifies the configuration information 312 responsive to receiving the recommendation 357. In some cases, the configuration information 312 is modified to include (or omit) a particular one of the available components 320 in the initial workspace 330 based on an indication that the particular component is recommended for inclusion (or omission). For example, the application instance 310 modifies the configuration information 312 to include the displayed components 325a and 325b, based on the recommendation 357 indicating inclusion of corresponding available components 320a and 320b. Additionally or alternatively, the application instance 310 modifies the configuration information 312 to omit an additional component, based on the recommendation 357 indicating omission of the corresponding available component 320c. In some cases, the configuration information 312 is modified based on additional information, such as preferences data imported from an additional application.

Based on the modified configuration information 312, the application instance 310 generates and provides for display the initial workspace 330, such as upon an initial execution of a user interface with a workspace for the application instance 310. In such cases, the user's first experience with the workspace of the application instance includes user interface components that are recommended for the user, based in part on a similarity between the user features 315 and the historical user features 385. The application instance 310 can improve performance and reduce required computing resources by loading the recommended components and omitting components that are not recommended. In addition, the user may find the initial workspace 330 to be simpler and more efficient to use, such as by focusing on recommended components that are relevant to other users with similar user features.

Figure 4:
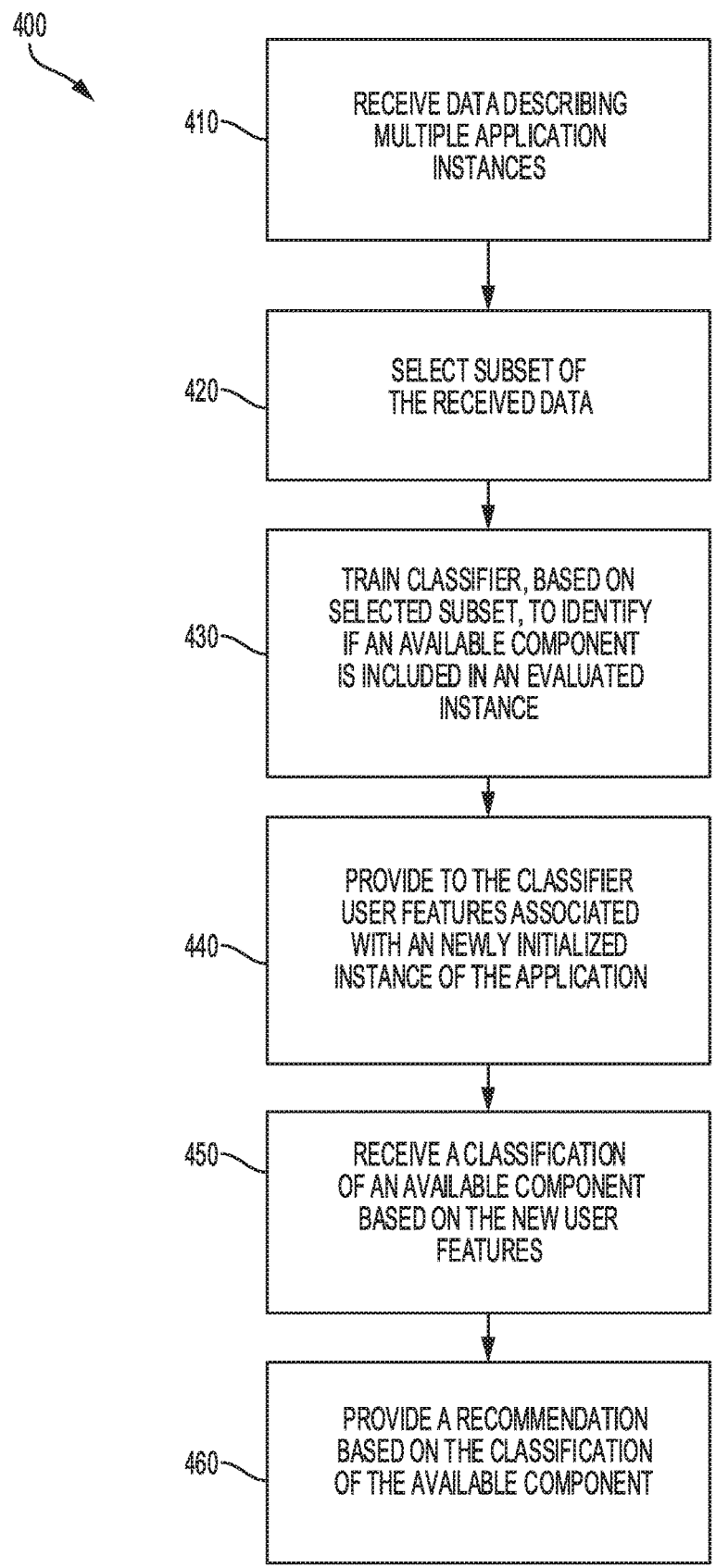
FIG. 4 is a flow chart depicting an example of a process for classifying user interface components based on user features, according to certain embodiments.

FIG. 4 is a flow chart depicting an example of a process 400 for classifying user interface components based on user features. In some embodiments, such as described in regards to FIGS. 1-3, a computing device executing an initial workspace recommendation engine implements operations described in FIG. 4, by executing suitable program code. For illustrative purposes, the process 400 is described with reference to the examples depicted in FIGS. 1-3. Other implementations, however, are possible.

At block 410, the process 400 involves receiving data describing multiple instances of an application. For example, the initial workspace recommendation engine 250 receives data describing the installed application instances 270. In some cases, the data describes one or more user interface components, such as available components 220, that are available for inclusion in workspaces of the instances. Additionally or alternatively, the data describes user features associated with the instances. In some cases, the described user features are associated with a particular user interface component included in one or more workspaces of the application instances. For example, one or more of the historical user features 275 are associated with the evaluated component 284a.

At block 420, the process 400 involves selecting a subset of the received data. In some cases, the selection of a subset is based on one or more criteria applied to the received data. For example, a training subset is selected based on a criterion indicating whether or not a particular application instance has been evaluated. Additional criteria include, for example, a usage frequency or usage pattern of the application instances, or a status of a license for the application instances.

At block 430, the process 400 involves training one or more classifiers, such as one or more logistic regression classifiers. In some cases, the classifiers are trained based on the selected subset of the received data. For example, the component classifiers 260 are trained based on a subset of data associated with the evaluated application instances 280. In some cases, a classifier is trained to identify that an available component described by the subset of received data is included in the workspace of a first evaluated instance associated with a first set of user features. Additionally or alternatively, the classifier is trained to identify that the available component is omitted from the workspace of a second evaluated instance associated with a second set of user features. In some cases, each classifier is trained to classify a particular user interface component. For example, component classifier 260a is trained to classify the available component 220a.

At block 440, the process 400 involves providing a set of new user features to the trained classifier. In some cases, the set of the new user features is associated with an initial instance of the application, such as a newly installed instance. For example, a newly initialized application instance 310 provides user features 315 to one or more component classifiers 360.

At block 450, the process 400 involves receiving one or more classifications of the available components for the initial instance of the application. The classification of the available component indicates, for example, whether to include the component in an initial workspace of the initial instance of the application. For example, a classification of the available components 320 is received from each of the component classifiers 360, indicating whether to include the available components 320 in the initial workspace 330.

At block 460, the process 400 involves providing a recommendation indicating whether to include or omit the one or more available components in the initial workspace. In some cases, the recommendation is generated based on the classifications of the available components. The recommendation 357, for example, is based on classifications of the available component 320. The recommendation is provided, for example, to the initial instance of the application. For example, the initial workspace recommendation engine 350 provides the recommendation 357 to the application instance 310. Based on the recommendation 357, the application instance 310 determines a configuration of the initial workspace 330. In some cases, configuration information describing the initial workspace is modified based on the recommendation. For example, the application instance 310 modifies the configuration information 312 based on information included in the recommendation 357.

Figure 5:
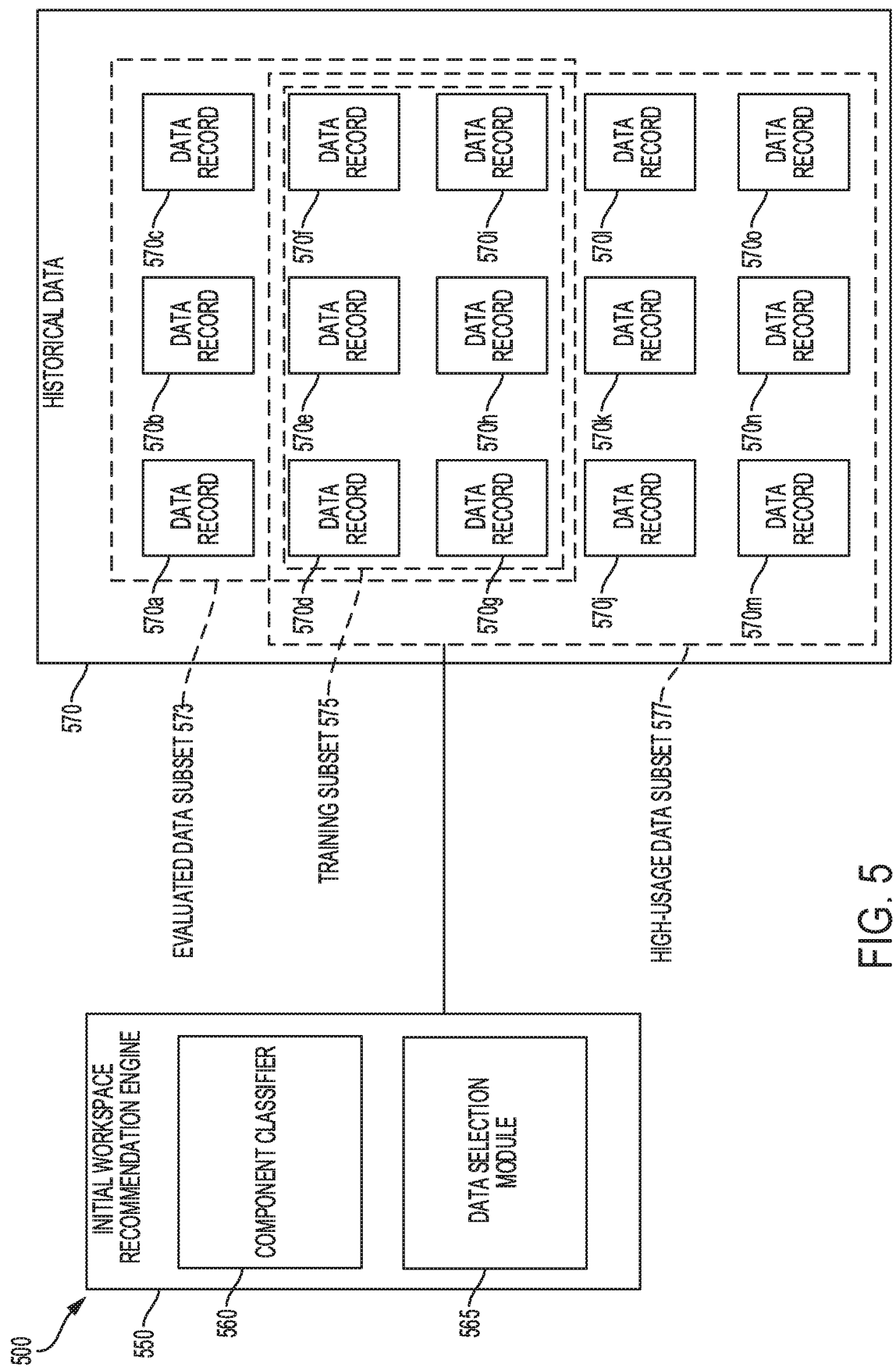
FIG. 5 is a block diagram depicting an example of a system capable of selecting one or more sets of data for use by a classifier, according to certain embodiments.

FIG. 5 is an example of a system 500 in which one or more sets of data are selected for use by a classifier. In system 500, an initial workspace recommendation engine 550 accesses historical data 570. The historical data 570 describes, for example, installed instances of an application, such as the installed application instances 270 described in regards to FIG. 2. In some cases, the historical data 570 includes data records 570a-570o, and each of the data records is associated with a particular instance of the installed application instances. The historical data 570 is provided, for example, by a data storage component, such as a database, local storage device (e.g., a hard drive), virtual storage component (e.g., cloud storage), or any other suitable storage component. Additionally or alternatively, the historical data 570 is generated based on the installed instances of the application, such as in response to a query or analysis operation performed by the initial workspace recommendation engine 550.

In the system 500, the initial workspace recommendation engine 550 includes at least one component classifier, such as component classifier 560, and a data selection module 565. The data selection module 565 selects one or more data records, such as any of the data records 570a-570o, and generates a data subset based on the selected data records. In some cases, the generated data subset is provided to the component classifier 560, such as for training. Based on the data subset generated by the data selection module 565, the component classifier 560 undergoes training to classify an available user interface component, such as described in regards to FIGS. 2 and 3.

In some embodiments, each of the data records 570a-570o include one or more historical user features describing the users or computing systems associated with the installed instances of the application. For example, a particular data record includes historical user features describing a user's profession and age, and licensing of other applications (e.g., other products installed on the user's computing system). Additionally or alternatively, each of the data records 570a-570o include data describing workspaces associated with the installed instances of the application. For example, the particular data record includes data describing whether the workspace of the user's application instance displays one or more of the available user interface components. Additionally or alternatively, each of the data records 570a-570o include data describing one or more usage states of the installed instances of the application. For example, the particular data record includes data describing whether the user's application instance has a trial license, an expired license, or a paid membership license. In some cases, one or more of the data records 570a-570o includes information describing a configuration of an application instance workspace (e.g., a "snapshot") at the time the evaluation was completed.

In some cases, the data included in the data records 570a-570o is represented as a tuple. For example, a tuple in a particular data record indicates a set of information in a format that is similar to other tuples (e.g., similar to tuples included in the remaining data records). Additionally or alternatively, the format of the tuple is accessible by the component classifier 560, such that the component classifier 560 interprets the information included in each tuple. Table 1, presented below, describes some tuples for a group of example users. In Table 1, the tuples are presented in an example format that includes historical user features, an indication of whether a particular user interface component is included in the workspace of the example users, and an indication of the license state of the application instances of the example users. The parameters, descriptions, and values included in Table 1 are exemplary, and should not be considered limiting. Although the tuples included in Table 1 are described using text, other representations are possible, including representations not intended for human interpretation (e.g., database records, software-implemented data structures).

TABLE 1

| | |
|---|---|
| Tuple format | {Profession, Age, Country, OtherLicensedProducts, ComponentA, LicenseType} |
| User 1 | {Graphic_Designer, 37, IN, 2, Yes, Paid} |
| User 2 | {Photographer, 26, US, 0, Yes, Trial} |
| User 3 | {Web_Developer, 31, CA, 0, No, Paid} |

In the system 500, the data selection module 565 applies one or more filter criteria to the historical data 570. Additionally or alternatively, the data selection module 565 generates a data subset based on the one or more applied filter criteria. The filter criteria include, for example, whether a user has completed an evaluation of a particular application instance. Additionally or alternatively, the filter criteria include one or more of whether usage of an application instance exceeds a threshold usage time, or whether a license of the application instance transitioned (e.g., was converted or expired) within a threshold window of time. For example, the data selection module 565 may compare a conversion timestamp (or expiration timestamp) of a license to the threshold window of time, and determine if the license was converted (or expired) during the window of time based on the comparison.

In some embodiments, the data selection module 565 determines one or more subsets of the historical data 570 based on the applied filter criteria. For example, based on a first filter criteria indicating whether the user has completed an evaluation of the user's application instance, the data selection module 565 determines a first subset 573. The subset of evaluated data 573 includes data records associated with evaluated application instances (such as evaluated application instances 280, as described in regards to FIG. 2). Additionally or alternatively, the data selection module 565 determines a second subset 577, based on a second filter criteria indicating whether usage of the user's application instance exceeds a threshold usage time. The subset of high-usage data 577 includes data records associated with application instances with a usage time exceeding the threshold (such as active application instances 287, as described in regards to FIG. 2). In some cases, additional subsets are determined based on additional criteria (e.g., a criteria indicating whether a license transitioned within a threshold window of time).

In some cases, the data selection module 565 determines a training subset 575 based on the one or more applied criteria. The training subset 575 includes, for example, one or more of the data records 570a-570o that include information matching the applied criteria. In the system 500, the data selection module 565 determines a training subset including data records 570d, 570e, 570f, 570g, 570h, and 570i, based on the data records 570 that match the first and second applied criteria. The training subset 575 is provided, for example, to the component classifier 560. Additionally or alternatively, the component classifier 560 undergoes training to classify user interface components of the application workspace based on the information included in the training set 575.

In some embodiments, a component classifier, such as the component classifier 560, performs classification of available components based on information included in tuples, such as tuples included in (or generated from) the training subset 575. Additionally or alternatively, the component classifier is trained based on the tuples. For example, in the system 500 the component classifier 570 receives the training subset 575. The training subset 575 includes multiple tuples that include user features associated with multiple workspaces (e.g., such as described in regards to Table 1). Additionally or alternatively, the training subset 575 indicates whether a particular available component is included in the respective workspace associated with each of the multiple tuples. For example, the training subset 575 includes a tuple such as {User_Feature1, User_Feature2, User_Feature3, Yes} indicating one or more user features (e.g., "User_Feature1") and inclusion data indicating that the particular available component is included in the associated workspace (e.g., "Yes"). Although this example uses text to represent the user features and the inclusion data, other representations are possible, such as numerals (e.g., "1," "0"), Boolean data (e.g., "True," "False"), or representations not intended for human interpretation.

In the system 500, the component classifier 560 determines a prediction function based on the training set 575. For example, a logistic regression classifier included in the component classifier 560 determines a prediction function based on the tuples included in the training subset 575. Based on the user features in each tuple, the logistic regression classifier determines that the particular available component described in each tuple is included in a first workspace having a first set of user features, and omitted from a second workspace having a second set of user features. In some cases, each available component is classified by a particular component classifier (such as component classifiers 360a-360c, described in regards to FIG. 3), such that during training, each particular component classifier determines a particular prediction function for the respective available component.

Additionally or alternatively, the trained component classifier receives a tuple including new user features associated with a newly installed application instance (such as user features 315 described in regards to FIG. 3). The trained component classifier receives, for example, a tuple indicating the new user features, and produces an output indicating the classification of the available component based on the new user features. For example, the logistic regression classifier receives a tuple of new user features such as {User_FeatureA, User_FeatureB, User_FeatureC} and produces an output tuple indicating the classification of the available component, such as an output tuple {Yes}. Although this example uses text to represent the user features and the inclusion data, other representations are possible, including representations not intended for human interpretation.

Figure 6:
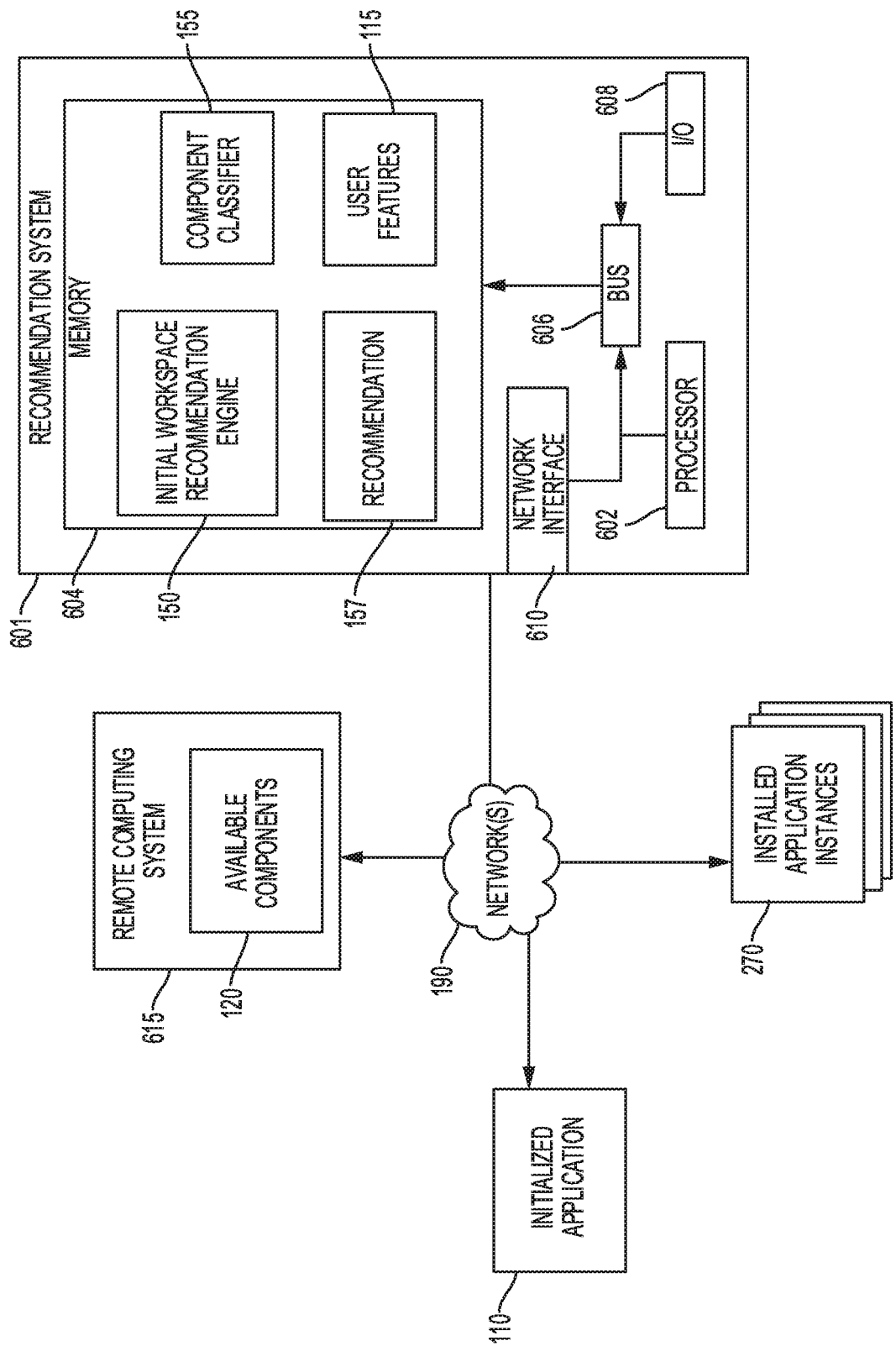
FIG. 6 is a block diagram depicting an example of a recommendation system capable of classifying components available for inclusion in an initial workspace, according to certain embodiments.

Any suitable computing system or group of computing systems can be used for performing the operations described herein. For example, FIG. 6 is a block diagram depicting a system capable of classifying components available for inclusion in an initial workspace, according to certain embodiments.

The depicted example of a recommendation system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the initial workspace recommendation engine 150, the component classifier 155, the user features 115, the recommendation 157, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The recommendation system 601 may also include a number of external or internal devices such as input or output devices. For example, the recommendation system 601 is shown with an input/output ("I/O") interface 608 that can receive input from input devices or provide output to output devices. A bus 606 can also be included in the recommendation system 601. The bus 606 can communicatively couple one or more components of the recommendation system 601.

The recommendation system 601 executes program code that configures the processor 602 to perform one or more of the operations described above with respect to FIGS. 1-5. The program code includes operations related to, for example, one or more of the initial workspace recommendation engine 150, the component classifier 155, the user features 115, the recommendation 157, or other suitable programmed modules or memory structures that perform one or more operations described herein. The program code may be resident in the memory device 604 or any suitable computer-readable medium and may be executed by the processor 602 or any other suitable processor. In some embodiments, the program code described above, the initial workspace recommendation engine 150, the component classifier 155, the user features 115, and the recommendation 157 are stored in the memory device 604, as depicted in FIG. 6. In additional or alternative embodiments, one or more of the initial workspace recommendation engine 150, the component classifier 155, the user features 115, the recommendation 157, and the program code described above are stored in one or more memory devices accessible via a data network, such as a memory device accessible via a cloud service.

The recommendation system 601 depicted in FIG. 6 also includes at least one network interface 610. The network interface 610 includes any device or group of devices suitable for establishing a wired or wireless data connection to one or more data networks 190. Non-limiting examples of the network interface 610 include an Ethernet network adapter, a modem, and/or the like. In some implementations, one or more remote computing systems 615 are connected to the recommendation system 601 via the network(s) 190, and the remote computing system 615 can perform some of the operations described herein, such as providing available components 120 or providing user features 115. The recommendation system 601 is able to communicate with one or more of the remote computing system 615, the initialized application instance 110, or with additional application instances (such as the installed application instances 270) using the network interface 610. Although FIG. 6 depicts the available components 120 as included in the remote computing system 615 and accessible by the recommendation system 601 via the networks 190, other embodiments are possible, including the available components 120 being stored in the memory 604 of recommendation system 601.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for modifying an initial workspace for a newly initialized application instance of an application, the method comprising:
   providing, to a trained classifier, a set of new user features for an initial workspace of a newly initialized application instance, wherein the set of new user features describes characteristics of a user requesting initialization of the newly initialized application instance on a user device;
   receiving, from the trained classifier, a classification of an available user interface component, wherein the classifier classifies the available user interface component based on a similarity between the set of new user features and a training set of user features, wherein the training set of user features is a set of features used to train the trained classifier and wherein the training set of user features contains features describing additional users associated with multiple previously installed instances of the application on multiple respective user devices;
   generating a recommendation to include the available user interface component in the initial workspace of the newly initialized application instance based on the classification of the available user interface component; and
   providing the recommendation to the user device, wherein the recommendation causes the user device to configure the newly initialized application instance to include the available user interface component in the initial workspace.

2. The method of claim 1, wherein the recommendation includes configuration data for modifying a configuration of the initial workspace.

3. The method of claim 1, further comprising:
   receiving historical data describing the multiple previously installed instances of the application, wherein:
       each previously installed instance includes a workspace comprising a graphical user interface,
       the historical data further describes (i) the available user interface component, the available user interface component being further available for inclusion in the graphical user interface of the workspace for each of the previously installed instances, and (ii) a first set of user features describing additional characteristics of a first group of additional users associated with one or more of the previously installed instances;
   selecting, from the historical data, a subset of the historical data, wherein the selected subset describes a first instance of the previously installed instances and a second instance of the previously installed instances;
   providing the selected subset to the trained classifier; and
   training the trained classifier based on the selected subset, wherein upon completion of the training the trained classifier:

(i) identifies that the available user interface component is included in a first workspace of the first instance, wherein the first instance is associated with the first set of user features, and (ii) identifies that the available user interface component is omitted from a second workspace of the second instance, wherein the second instance is associated with a second set of user features.

4. The method of claim 3, wherein the selected subset is selected based on criteria describing multiple usage patterns, each of the multiple usage patterns associated with a respective one of the previously installed instances.

5. The method of claim 4, wherein the criteria describing the multiple usage patterns include one or more of:
a conversion of a trial license associated with one of the previously installed instances;
an expiration of another trial license associated with another one of the previously installed instances;
a window of time during which the conversion or expiration occurred; or
an amount of usage time associated with another one of the previously installed instances, wherein the amount of usage time is greater than a threshold of usage time.

6. The method of claim 1, further comprising:
receiving historical data describing the multiple previously installed instances of the application, and further describing one or more additional components available for inclusion in each workspace for each of the previously installed instances;
training one or more additional classifiers, based on the historical data, to identify (i) that one of the additional components is included in a first workspace of a first instance of the previously installed instances, and (ii) that the one of the additional components is omitted from a second workspace of a second instance of the previously installed instances;
providing to each of the one or more additional trained classifiers the set of new user features;
receiving from each of the one or more additional trained classifiers an additional classification of the one of the additional components; and
generating an additional recommendation to include the one of the additional components, based on the additional classifications,
wherein the recommendation describes the one of the additional components in the initial workspace of the newly initialized application instance, and
wherein the recommendation further causes the user device to configure the newly initialized application instance to include the one of the additional components in the initial workspace.

7. The method of claim 1, wherein the trained classifier is a logistic regression classifier.

8. The method of claim 1, wherein the classification of the available user interface component indicates that the available user interface component is included in one or more of the multiple previously installed instances of the application, wherein the one or more of the multiple previously installed instances are associated with historical user features.

9. A system for modifying an initial workspace for a newly initialized application instance of an application, the system comprising:
a means for providing, to a trained classifier, a set of new user features for an initial workspace of a newly initialized application instance, wherein the set of new user features describes characteristics of a user requesting initialization of the newly initialized application instance on a user device;
a means for receiving, from the trained classifier, a classification of an available user interface component, wherein the classifier classifies the available user interface component based on a similarity between the set of new user features and a training set of user features, wherein the training set of user features is a set of features used to train the trained classifier and wherein the training set of user features contains features describing additional users associated with multiple previously installed instances of the application on multiple respective user devices;
a means for generating a recommendation to include the available user interface component in the initial workspace of the newly initialized application instance based on the classification of the available user interface component; and
a means for providing the recommendation to the user device, wherein the recommendation causes the user device to configure the newly initialized application instance to include the available user interface component in the initial workspace.

10. The system of claim 9, wherein the recommendation includes configuration data for modifying a configuration of the initial workspace.

11. The system of claim 9, the system further comprising:
a means for receiving historical data describing the multiple previously installed instances of the application, wherein:
each previously installed instance includes a workspace comprising a graphical user interface,
the historical data further describes (i) the available user interface component, the available user interface component being further available for inclusion in the graphical user interface of the workspace for each of the previously installed instances, and (ii) a first set of user features describing additional characteristics of a first group of additional users associated with one or more of the previously installed instances;
a means for selecting, from the historical data, a subset of the historical data, wherein the selected subset describes a first instance of the previously installed instances and a second instance of the previously installed instances; and
training the trained classifier based on the selected subset, wherein upon completion of the training the trained classifier:
(i) identifies that the available user interface component is included in a first workspace of the first instance, wherein the first instance is associated with the first set of user features, and
(ii) identifies that the available user interface component is omitted from a second workspace of the second instance, wherein the second instance is associated with a second set of user features.

12. The system of claim 11, wherein the selected subset is selected based on criteria describing multiple usage patterns, each of the multiple usage patterns associated with a respective one of the previously installed instances.

13. The system of claim 12, wherein the criteria describing the multiple usage patterns include one or more of:
a conversion of a trial license associated with one of the previously installed instances;

an expiration of another trial license associated with another one of the previously installed instances;
a window of time during which the conversion or expiration occurred; or
an amount of usage time associated with another one of the previously installed instances, wherein the amount of usage time is greater than a threshold of usage time.

14. The system of claim 9, the system further comprising:
a means for receiving historical data describing the multiple previously installed instances of the application, and further describing one or more additional components available for inclusion in each workspace for each of the previously installed instances;
a means for training one or more additional classifiers, based on the historical data, to identify (i) that one of the additional components is included in a first workspace of a first instance of the previously installed instances, and (ii) that the one of the additional components is omitted from a second workspace of a second instance of the previously installed instances;
a means for providing to each of the one or more additional trained classifiers the set of new user features;
a means for receiving from each of the one or more additional trained classifiers an additional classification of the one of the additional components; and
a means for generating an additional recommendation to include the one of the additional components, based on the additional classifications,
wherein the recommendation describes the one of the additional components to include in the initial workspace, and
wherein the recommendation further causes the user device to configure the newly initialized application instance to include the one of the additional components in the initial workspace.

15. A non-transitory computer-readable medium embodying program code for modifying an initial workspace for a newly initialized application instance of an application, the program code comprising instructions which, when executed by a processor, cause the processor to perform operations comprising:
providing, to a trained classifier, a set of new user features for an initial workspace of a newly initialized application instance, wherein the set of new user features describes characteristics of a user requesting initialization of the newly initialized application instance on a user device;
receiving, from the trained classifier, a classification of an available user interface component, wherein the classifier classifies the available user interface component based on a similarity between the set of new user features and a training set of user features, wherein the training set of user features is a set of features used to train the trained classifier and wherein the training set of user features contains features describing additional users associated with multiple previously installed instances of the application on multiple respective user devices;
generating a recommendation to include the available user interface component in the initial workspace of the newly initialized application instance based on the classification of the available user interface component; and
providing the recommendation to the user device, wherein the recommendation causes the user device to configure the newly initialized application instance to include the available user interface component in the initial workspace.

16. The non-transitory computer-readable medium of claim 15, wherein the recommendation includes configuration data for modifying a configuration of the initial workspace.

17. The non-transitory computer-readable medium of claim 15, wherein the operations further comprise:
receiving historical data describing the multiple previously installed instances of the application, wherein:
each previously installed instance includes a workspace comprising a graphical user interface,
the historical data further describes (i) the available user interface component, the available user interface component being further available for inclusion in the graphical user interface of the workspace for each of the previously installed instances, and (ii) a first set of user features describing additional characteristics of a first group of additional users associated with one or more of the previously installed instances;
selecting, from the historical data, a subset of the historical data, wherein the selected subset describes a first instance of the previously installed instances and a second instance of the previously installed instances;
providing the selected subset to the trained classifier; and
training the trained classifier based on the selected subset, wherein upon completion of the training the trained classifier:
(i) identifies that the available user interface component is included in a first workspace of the first instance, wherein the first instance is associated with the first set of user features, and
(ii) identifies that the available user interface component is omitted from a second workspace of the second instance, wherein the second instance is associated with a second set of user features.

18. The non-transitory computer-readable medium of claim 17, wherein the selected subset is selected based on criteria describing multiple usage patterns, each of the multiple usage patterns associated with a respective one of the previously installed instances.

19. The non-transitory computer-readable medium of claim 18, wherein the criteria describing the multiple usage patterns include one or more of:
a conversion of a trial license associated with one of the previously installed instances;
an expiration of another trial license associated with another one of the previously installed instances;
a window of time during which the conversion or expiration occurred; or
an amount of usage time associated with another one of the previously installed instances, wherein the amount of usage time is greater than a threshold of usage time.

20. The non-transitory computer-readable medium of claim 15, wherein the operations further comprise:
receiving historical data describing the multiple previously installed instances of the application, and further describing one or more additional components available for inclusion in each workspace for each of the previously installed instances;
training one or more additional classifiers, based on the historical data, to identify (i) that one of the additional components is included in a first workspace of a first instance of the previously installed instances, and (ii) that the one of the additional components is omitted from a second workspace of a second instance of the previously installed instances, providing to each of the one or more additional trained classifiers the set of new user features, receiving from each of the one or more additional trained classifiers an additional classification of the one of the additional components, and generating an additional recommendation to include the one of the additional components, based on the additional classifications;

the recommendation describes the one of the additional components to include in the initial workspace; and the recommendation further causes the user device to configure the newly initialized application instance to include the one of the additional components in the initial workspace.

* * * * *